(12) United States Patent
Sommer

(10) Patent No.: US 7,959,362 B2
(45) Date of Patent: Jun. 14, 2011

(54) ELECTRO-OPTICAL PLUG AND RECEPTACLE

(76) Inventor: Sigmund Sommer, Las Vegas, NV (US)

( * ) Notice: Subject to any disclaimer, the term of this patent is extended or adjusted under 35 U.S.C. 154(b) by 0 days.

(21) Appl. No.: 12/349,193

(22) Filed: Jan. 6, 2009

(65) Prior Publication Data

US 2009/0148105 A1    Jun. 11, 2009

Related U.S. Application Data

(63) Continuation of application No. 11/505,574, filed on Aug. 16, 2006, now Pat. No. 7,490,996.

(51) Int. Cl.
*G02B 6/40* (2006.01)
(52) U.S. Cl. .................. 385/75; 385/88; 385/89
(58) Field of Classification Search ............ 385/75, 385/88, 89
See application file for complete search history.

(56) References Cited

U.S. PATENT DOCUMENTS

| | | | |
|---|---|---|---|
| 4,767,181 A | 8/1988 | McEowen | |
| 5,109,452 A | 4/1992 | Selvin et al. | |
| 5,117,122 A * | 5/1992 | Hogarth et al. | 307/140 |
| 5,242,315 A * | 9/1993 | O'Dea | 439/577 |
| 5,345,520 A | 9/1994 | Grile | |
| 5,397,929 A | 3/1995 | Hogarth et al. | |
| 5,419,717 A | 5/1995 | Abendschein et al. | |
| 5,647,043 A | 7/1997 | Anderson et al. | |
| 5,696,861 A | 12/1997 | Schimmeyer et al. | |
| 5,967,840 A | 10/1999 | Rose et al. | |
| 6,018,126 A * | 1/2000 | Castellani et al. | 174/483 |
| 6,033,125 A * | 3/2000 | Stillie et al. | 385/75 |
| 6,071,015 A | 6/2000 | Erbse et al. | |
| 6,114,632 A | 9/2000 | Planas, Sr. et al. | |
| 6,175,078 B1 | 1/2001 | Bambardekar et al. | |
| 6,456,768 B1 | 9/2002 | Boncek et al. | |
| 6,478,625 B2 | 11/2002 | Tolmie et al. | |
| 6,533,466 B1 | 3/2003 | Smith | |
| 6,543,941 B1 * | 4/2003 | Lampert | 385/58 |
| 6,558,045 B2 * | 5/2003 | Yamaguchi | 385/75 |
| 6,588,938 B1 | 7/2003 | Lampert et al. | |
| 6,608,264 B1 | 8/2003 | Fouladpour | |
| 6,855,881 B2 * | 2/2005 | Khoshnood | 174/15.1 |
| 6,899,467 B2 | 5/2005 | McDonald et al. | |
| 6,910,807 B2 | 6/2005 | Lu | |
| 6,931,183 B2 | 8/2005 | Panak et al. | |
| 6,932,517 B2 | 8/2005 | Swaynze et al. | |
| 6,974,262 B1 | 12/2005 | Rickenbach | |
| 7,326,087 B2 * | 2/2008 | Gerlach et al. | 439/660 |
| 7,429,137 B2 * | 9/2008 | Sontag et al. | 385/75 |
| 7,612,653 B2 * | 11/2009 | Miller et al. | 340/286.02 |

(Continued)

FOREIGN PATENT DOCUMENTS

JP    09-116498    5/1997

(Continued)

OTHER PUBLICATIONS

Aerne AVS/Bang and Olufsen Masterlink/Powerlink combination wall socket, retrieved from http://www.aerne.com Apr. 18, 2006, 2 pgs.

(Continued)

*Primary Examiner* — Ellen Kim
(74) *Attorney, Agent, or Firm* — Baker & Daniels LLP

(57) ABSTRACT

A combination fiber optic and electrical connector and a plug for mating therewith are both provided.

22 Claims, 3 Drawing Sheets

U.S. PATENT DOCUMENTS

| | | |
|---|---|---|
| 2002/0064356 A1 | 5/2002 | Spooner |
| 2002/0110339 A1 | 8/2002 | Dittmann |
| 2002/0126967 A1 | 9/2002 | Panak et al. |
| 2002/0141713 A1 | 10/2002 | Okada et al. |
| 2003/0129872 A1 | 7/2003 | Tolmie |
| 2003/0147601 A1* | 8/2003 | Bartur et al. ............ 385/92 |
| 2003/0156798 A1 | 8/2003 | Cull |
| 2003/0167631 A1* | 9/2003 | Hallenbeck ............ 29/835 |
| 2003/0202756 A1 | 10/2003 | Hurley et al. |
| 2003/0215197 A1 | 11/2003 | Simon et al. |
| 2003/0235379 A1 | 12/2003 | Lin |
| 2004/0000816 A1* | 1/2004 | Khoshnood ............ 307/149 |
| 2004/0105635 A1 | 6/2004 | Nandi et al. |
| 2004/0197058 A1 | 10/2004 | Eichelberger et al. |
| 2004/0218873 A1* | 11/2004 | Nagashima et al. ............ 385/75 |
| 2005/0136722 A1* | 6/2005 | Cairns ............ 439/271 |
| 2006/0029336 A1* | 2/2006 | Gunther et al. ............ 385/92 |
| 2007/0116411 A1* | 5/2007 | Benton et al. ............ 385/53 |

FOREIGN PATENT DOCUMENTS

| | | |
|---|---|---|
| JP | 2002-182070 | 6/2002 |
| JP | 2002-198120 | 7/2002 |
| JP | 2002-216883 | 8/2002 |
| WO | WO 98/08228 | 2/1998 |
| WO | WO 99/38951 | 8/1999 |
| WO | WO 03/093888 | 11/2003 |

OTHER PUBLICATIONS

Component Database Electrical Socket, Plugs, Receptacles, retrieved from http://www.medibix.com Apr. 18, 2006, 4 pgs.

L-Com® Connectivity Products, Fiber Optic Cables and Assemblies, retrieved from http://www.l-com.com Apr. 18, 2006, 2 pgs.

* cited by examiner

ELECTRO-OPTICAL PLUG AND RECEPTACLE

CROSS-REFERENCE TO RELATED APPLICATION

This application is a continuation of U.S. patent application Ser. No. 11/505,574, filed Aug. 16, 2006, the disclosure of which is expressly incorporated herein by reference.

FIELD OF THE INVENTION

The present invention relates generally to the high speed data communications. More particularly, the present invention relates to a device that provides high speed data lines and power in a combined connection.

BACKGROUND AND SUMMARY

Currently most high speed communications travel by copper wire. This is especially true in what is referred to as "the last mile." "The last mile" refers to the infrastructure at the neighborhood level. While most often discussed in the residential setting, businesses that receive high speed data lines and then distribute data lines within their company also contain last-mile architecture and the problems that go therewith.

While the majority of the "backbones" of high speed data communication have been upgraded to fiber optics, the last mile most often contains copper wire data lines. The last mile has traditionally used copper-based telephone wire or coaxial cable, but wireless technologies have begun to offer alternative options in some locations. In many communities, last-mile technology represents a major remaining challenge to high-bandwidth applications such as on-demand television, fast Internet access, and Web pages full of multimedia effects.

Accordingly, a device and method are provided for providing a receptacle and mating plug allowing a combination of power and fiber optic lines.

According to one aspect of the present invention, a combination fiber optic and electrical connector is provided. The combination includes a plug and a receptacle. The plug includes a pair of electrically conductive blades connected to a first pair of electrical conductors; and a first fiber optic conductor housed within one of the conductive blades. The receptacle includes a pair of engageable contacts for engaging the blades of the plug and a second fiber optic member such that seating the plug within the receptacle causes the blades to engage the contacts and causes the first fiber optic conductor to be positioned to allow communication with the second fiber optic member.

According to another aspect of the present invention, a power receptacle is provided. The power receptacle includes a first power socket. The first power socket includes a pair of engageable contacts for engaging live and common blades of a plug, a first optical member providing a first optical pathway, and a second optical member providing a second optical pathway distinct from the first optical pathway.

According to another aspect of the present invention, a power receptacle is provided. The power receptacle includes a first power socket. The first power socket includes first and second voids for respectively engaging live and common blades of a plug, wherein at least one of the voids includes a first optical member providing a first optical pathway.

According to another aspect of the present invention, a power receptacle is provided. The power receptacle includes first and second voids for respectively engaging live and common blades of a plug, a first optical member providing a first optical pathway; and a motherboard.

According to another aspect of the present invention, a power plug is provided. The power plug includes a live blade; a common blade; a first optical member providing a first optical pathway; and a second optical member providing a second optical pathway distinct from the first optical pathway.

According to another aspect of the present invention, a power plug is provided. The power plug includes a live blade; and a common blade, wherein at least one of the blades includes a first optical member providing a first optical pathway.

A power receptacle is provided including a first power socket. The first power socket includes at least one void containing an engageable contact for engaging a contact of a plug and a light-blocking shutter positioned proximate the void. The shutter has a first position assumed when a contact of a plug is not engaging the engageable contact of the socket and has a second position assumed when the contact of the plug is engaging the engageable contact of the socket. The light-blocking shutter prevents ambient light from entering the void when the shutter is in first position and when in the second position.

Additional features of the present invention will become apparent to those skilled in the art upon consideration of the following detailed description of the presently perceived best mode of carrying out the invention.

BRIEF DESCRIPTION OF THE DRAWINGS

The detailed description of the drawings particularly refers to the accompanying figures in which.

DETAILED DESCRIPTION OF THE DRAWINGS

Figure 1:
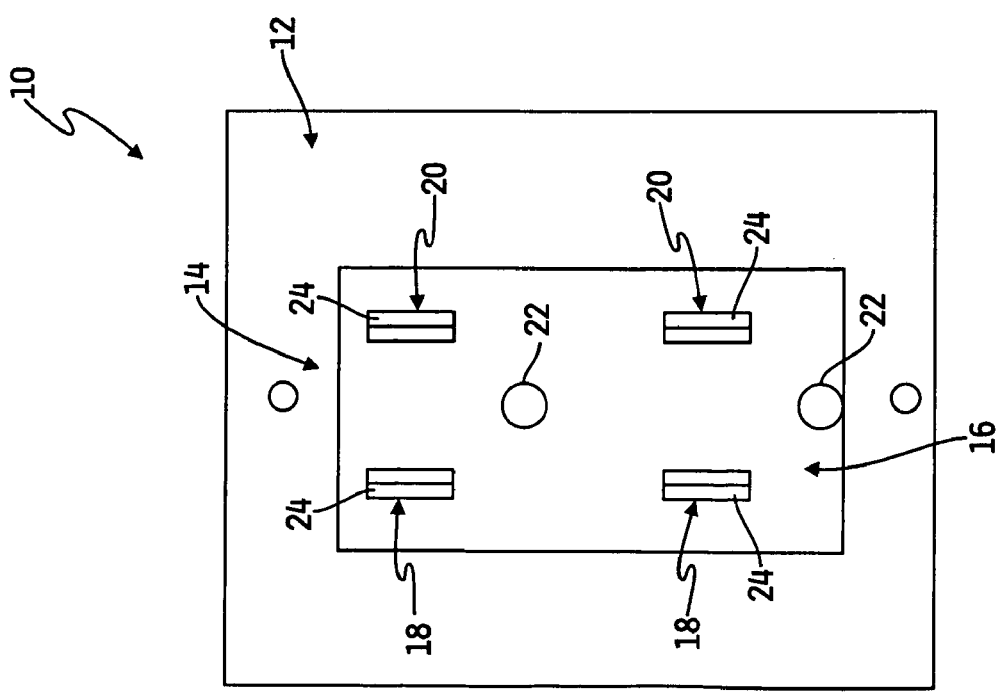
FIG. 1 is a front view of a receptacle.

A receptacle 10 for providing power and data and faceplate 12 are shown in FIG. 1. Receptacle 10 includes upper socket 14 and lower socket 16 defined in a front 33 of housing 31. Each socket 14, 16 includes two load voids 18, 20 and a ground void 22. Outer edges of voids 18, 20 each include a set of resilient shutters 24. Each shutter 24 abuts another shutter 24 in its rest state when no plug is mounted therein. Shutters 24 are pliable such that when force is applied to a plug, such as plug 26 of FIGS. 3-5, in an effort to seat plug 26 in a socket 14, 16, shutters 24 give way to allow such seating. Shutters 24 abut load leads 28, 30 when plug 26 is seated within socket 14, 16 as shown in FIG. 5. Shutters 24 are resilient such that they re-assume the position abutting another shutter 24 as shown in FIG. 1 when plug 26 is unseated from socket 14.

Figure 2:
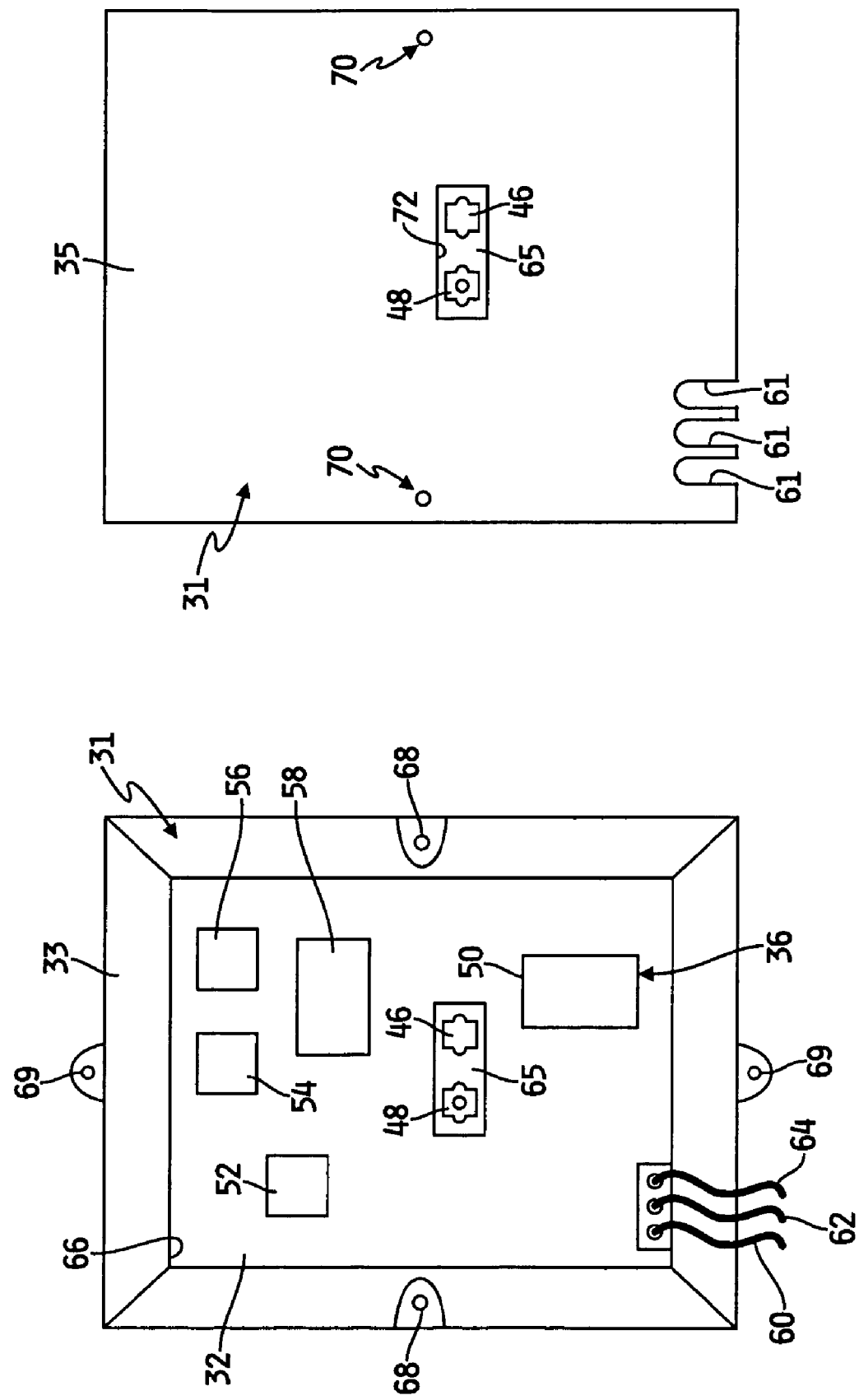
FIG. 2 is a rear exploded view of the receptacle of FIG. 1.

As shown in FIGS. 2 and 5, receptacle 10 includes housing 31 and a motherboard or substrate 32. Housing 31 includes front 33 and rear cover 35. In addition to the above listed features, front 33 includes a void 66 sized to receive motherboard 32 and also includes a pair of threaded voids 68 and non-threaded voids 69 as shown in FIG. 2. In use, bolts (not pictured) fasten rear cover 35 to front 33 by passing through voids 70 in rear cover 35 and being received in voids 68. Non-threaded voids 69 receive bolts therein to couple receptacle 10 to a junction box disposed in a wall or otherwise. Rear cover 35 includes a optical connector void 72 that receives port housing 65 therein and a plurality of lead voids 61.

Motherboard 32 has a front 34 and back 36. Front 34 includes first and second sets of load contacts 38, 40, ground contact set 41. Contact sets 38, 40, 41 are all positioned to align with voids 18, 20, 22 respectively. Front 34 of motherboard 32 also includes two optical sockets 42, 44 disposed inside contact sets 38, 40 respectively as shown in FIG. 5.

Back 36 of motherboard 32 includes optical input and output ports 46, 48, a processor 50, BIOS/proprietary programs chip 52, Java/OS chip 54, sensors chip 56, memory chip 58, and electrical leads 60, 62, 64 preferably coupled to a transformer 67. Input and output ports 46, 48 are optical ports. Ports 46, 48 include Toslink type connection receptacles to receive Toslink terminated cables therein. However, other mating connector/port sets suitable for transmitting optical signals on all current or future optical standards are also envisioned. Ports 46, 48 are optically coupled with optical sockets 42, 44 such that optical communication therebetween is achieved. Ports 46, 48 are disposed within port housing 65 such that ports 46, 48 are outwardly accessible when a rear cover 68 is attached to housing 31. Processor 50 communicates with the other chips 52, 54, 56, 58 to operate selected programs. Such programs include monitoring the operational status of receptacle 10, coordinating data transfer, data fault checking, detecting plugs and devices with which receptacle 10 is interacting, or any other programming to aid in providing efficient and effective data transfer. Processor 50 may coordinate data transfer by controlling optical sockets 42, 44 and ports 46, 48 to enable interoperability with plugs or junction boxes that only provide a single optical connection. Processor 50 may monitor the status of receptacle 10 by monitoring the temperature of the motherboard and other operational parameters.

Lead 60 is a powered, hot, or live lead coupled to motherboard 32 via transformer 67 to provide power to circuit 32 generally and chips 50, 52, 54, 56, 58 as well as load contact 38. Transformer 67 preferably avails load contact 38 a full 120 V whereas the various circuit components are provided a voltage less than 120 V. Lead 62 is a common or neutral lead coupled to motherboard 32, via transformer 67, to provide a return path for hot lead 60 and is specifically coupled to load contact 40. Lead 64 is a ground or earth lead for circuit 32 generally and specifically ground contact 41. It should be appreciated that transformer 67 may provide a variety of voltages to the circuit components as desired.

In use, lead 60 is coupled to a hot, typically black sheathed wire, (in U.S. three conductor wire) sometimes red sheathed wire (black and red are typically hot wires in U.S. four conductor wires) of a home, commercial, industrial, or otherwise wiring system within a receptacle junction box. Receptacle junction boxes are typically located in walls, floors, or ceilings and are exposed therethrough such that any receptacle or switch disposed therein is accessible. Likewise, lead 62 is coupled to a common wire, typically white sheathed in the U.S., of a home, commercial, industrial, or otherwise wiring system within a receptacle junction box. Lead 64 is typically coupled to a ground wire, typically unsheathed or green sheathed in the U.S., of a home, commercial, industrial, or otherwise wiring system within a receptacle junction box.

Whereas electrical leads 60, 62, 64 are heretofore described as wires permanently coupled to motherboard 32 via transformer 67, alternate embodiments are envisioned where leads 60, 62, 64 take the form of mounting screws (not pictured) exposed on the exterior of housing 31 and configured to receive hot, common, and ground wires of a home, commercial, industrial, or otherwise wiring system similarly to traditional receptacle mounting screws.

Optical ports 46, 48 are coupled to optical cables (not pictured) terminated with Toslink connections similarly located in a home, commercial, industrial, or otherwise data wiring system within the receptacle junction box. The optical cables are connected at other ends to a router or other data distributing means.

Accordingly, once coupled to two optical cables, hot, common, and ground leads, receptacle 10 is affixed within the junction box via bolts (not pictured) passed through non-threaded voids 69 and into threaded voids of the junction box. Once affixed within the junction box, faceplate 12 is affixed to receptacle 10.

Figure 3:
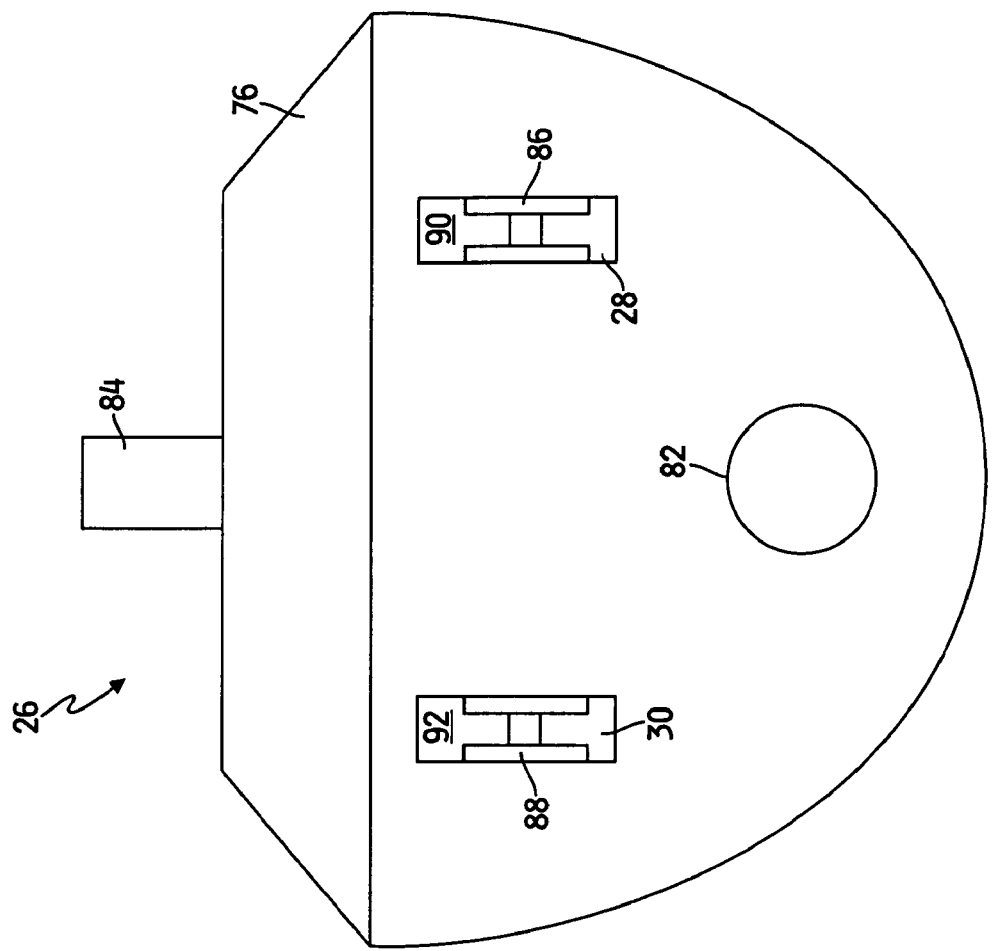
FIG. 3 is a end view of a plug configured to interface with the receptacle of FIG. 1.
Figure 4:
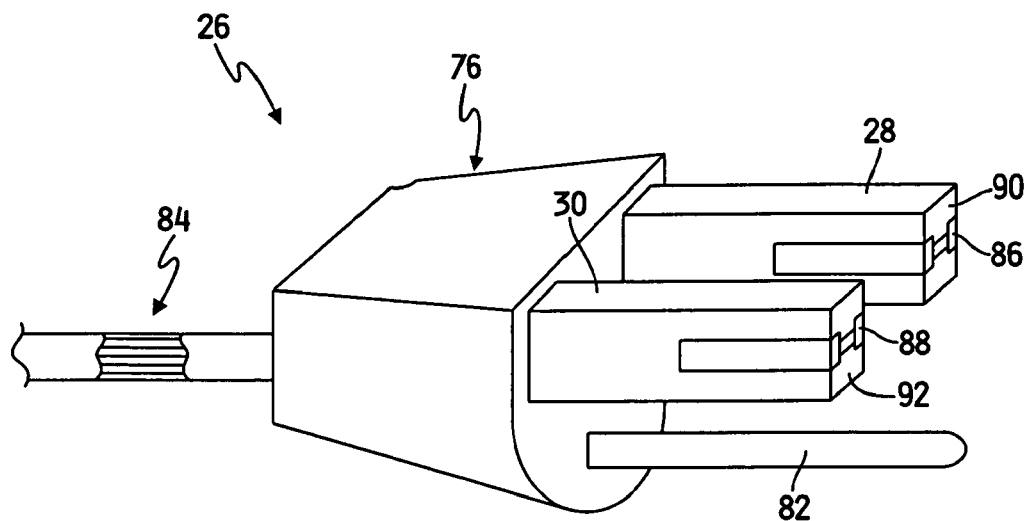
FIG. 4 is a perspective view of the plug of FIG. 3.
Figure 5:
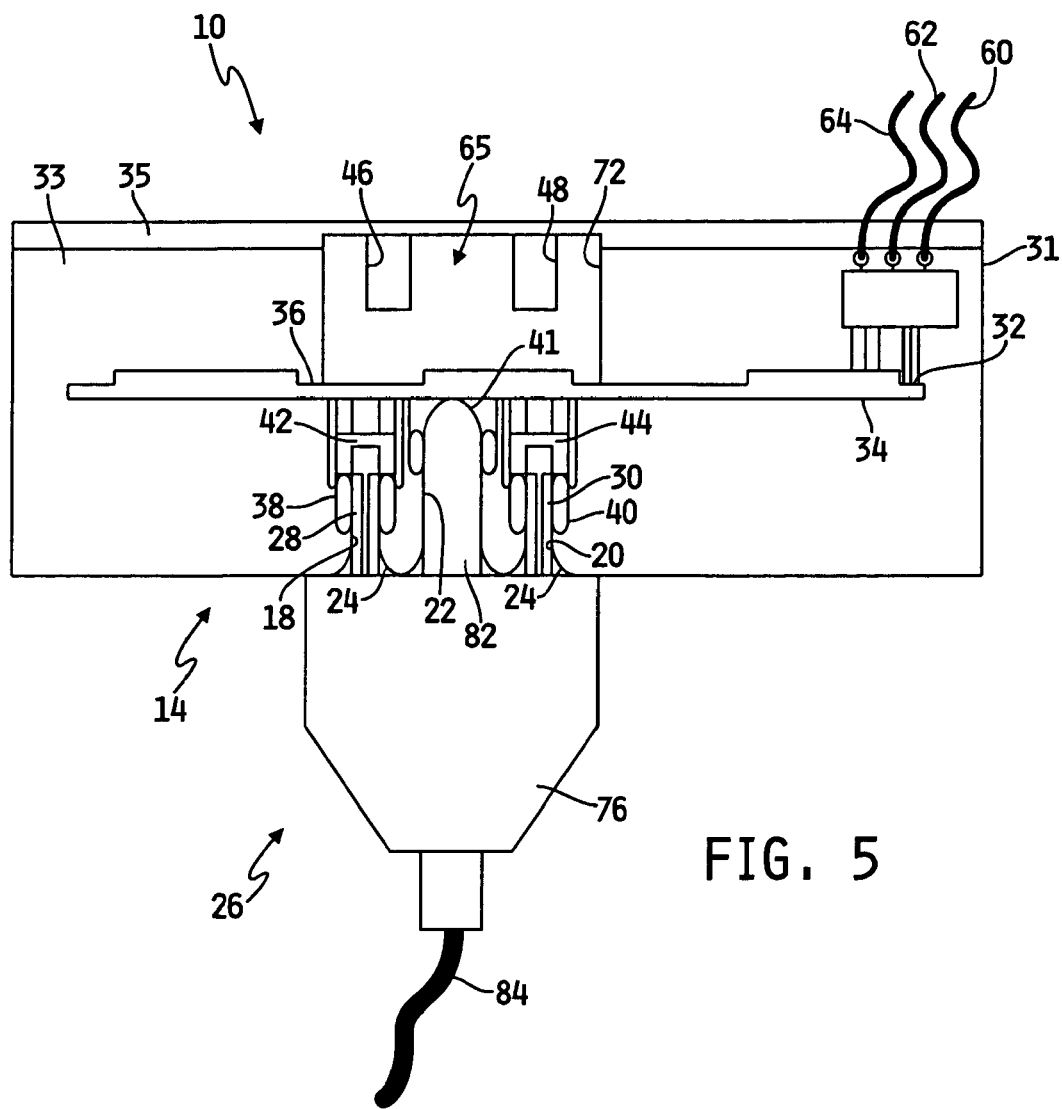
FIG. 5 is an overhead cross sectional view of the plug of FIG. 3 interfacing with the receptacle of FIG. 1.

FIGS. 3 and 4 show plug 26 configured to interface with sockets 14, 16 of receptacle 10. However, it should be appreciated that sockets 14, 16 of receptacle 10 are specifically configured to accept traditional three prong (Type B, such as American standard NEMA 5-15) and two prong (Type A, such as NEMA 1-15) plugs. Similarly, plug 26 is specifically configured to be received in traditional three prong sockets. Accordingly, it is anticipated that a user may first plug in a traditional plug to sockets 14, 16, then unplug the traditional plug from sockets 14, 16, and then plug in plug 26 to sockets 14, 16. Likewise, it is anticipated that a user may first place plug 26 in a traditional socket, then remove plug 26 from the socket, and then place plug 26 into receptacle 14, 16.

Plug 26 includes head 76, load prongs 28, 30, ground prong 82, and cord 84. Head 76 is constructed from a non-conductive plastic or the like. Each of load prongs 28, 30 includes a metal section 90, 92 and an optical transmitter 86, 88 disposed therein. In the provided embodiment, optical transmitter 86 is provided for and located to allow transmitting data to optical socket 44 and optical transmitter 88 is provided for and located to allow receiving data from optical socket 42. Transmitters 86, 88 are exposed on ends of prongs 28, 30 and are exposed on sides of prongs 28, 30 for approximately half the length of prongs 28, 30. Alternate embodiments are envisioned where transmitters 86, 88 are exposed only on ends of prongs 28, or on tops and bottoms and ends of prongs 28, 30. Ground prong 82 is a traditional electrically conductive ground prong as is known in the art.

Metal sections 90, 92 of load prongs 28, 30 are electrically coupled to respective electrically conductive wires in cord 84. Optical transmitters 86, 88 are optically coupled to respective optical wires in cord 84. Accordingly, cord 84 includes two conductive wires respectively coupled to load prongs 28, 30, another conductive wire coupled to ground prong 82, and two optical wires respectively coupled to optical transmitters 86, 88.

Embodiments including sockets for three-wire 120/240 volt appliances, with two live connections, a neutral, and ground, are also envisioned. Likewise, embodiments are envisioned for providing optical data lines for all traditional power plug/receptacle combinations (Types A-M).

Although the invention has been described in detail with reference to certain preferred embodiments, variations and modifications exist within the spirit and scope of the invention as described and defined in the following claims.

The invention claimed is:

1. A power receptacle including:
  a first power socket including:
    a pair of voids sized and shaped for receiving live and common blades of a plug,
    a pair of engageable contacts for engaging live and common blades of a plug, the engageable contacts being located within respective voids of the pair of voids, a first contact of the pair of engageable contacts being configured to transmit high voltage to a load and a second contact of the pair of contacts being configured to electrically couple a load to a neutral tie block;
a first optical member located within a first void of the pair of voids and providing a first optical pathway; and
a second optical member located within a second void of the pair of voids and providing a second optical pathway distinct from the first optical pathway.

2. The receptacle of claim 1, further including a second power socket including:
a pair of engageable contacts for engaging blades of a plug;
a third optical member providing a third optical pathway distinct from each of the first and second optical pathways; and
a fourth optical member providing a fourth optical pathway distinct from each of the first, second, and third optical pathways.

3. The receptacle of claim 1, wherein the first power socket further includes a contact member for engaging a ground pin of a plug.

4. The receptacle of claim 1, wherein the pair of engageable contacts for engaging live and common blades of a plug are positioned to engage live and common blades having a fixed orientation relative to each other.

5. The receptacle of claim 1, wherein the power socket is configured to be able to engage a standard wall plug.

6. The receptacle of claim 1, wherein the power receptacle is a wall outlet.

7. The receptacle of claim 6, wherein first and second contacts of the pair of engageable contacts are positioned to be able to receive blades of a plug selected from the group including a North American 15 A/125V ungrounded plug (Type A) and a North American 15 A/125V grounded plug (Type B).

8. A wall outlet power receptacle including:
first and second voids for respectively engaging live and common blades of a plug, the first void being configured to transmit high voltage to a load and the second void being configured to electrically couple a load to a neutral tie block,
a first optical member providing a first optical pathway; and
a motherboard located within a wall gang box.

9. The receptacle of claim 8, wherein first and second voids are located, sized, and shaped to engage live and common blades of a plug having a fixed orientation relative to each other.

10. The receptacle of claim 9, wherein first and second voids are positioned to be able to receive blades of a plug selected from the group including a North American 15 A/125V ungrounded plug (Type A) and a North American 15 A/125V grounded plug (Type B).

11. The receptacle of claim 8, wherein the motherboard includes memory storing programming for coordinating data transfer.

12. A power plug including:
a live blade configured to transmit voltage of at least 100 V to a load;
a common blade configured to electrically couple a load to a neutral tie block;
a first optical member providing a first optical pathway, the first optical member being at least partially disposed within one of the live blade and the common blade; and
a second optical member providing a second optical pathway distinct from the first optical pathway.

13. The plug of claim 12, wherein first optical member is at least partially disposed within the live blade and the second optical member is at least partially disposed in the common blade.

14. The plug of claim 12, further including a ground pin.

15. The plug of claim 12, wherein the blades are positioned to be receivable in a wall outlet of a type selected from types A-M.

16. The plug of claim 15, wherein the live and common blades are oriented conform to a standard for a North American 15 A/125V ungrounded plug (Type A) and a North American 15 A/125V grounded plug (Type B).

17. A power plug including:
a live blade configured to transmit high voltage to a load; and
a common blade configured to electrically couple a load to a neutral tie block of a circuit breaker box, wherein at least one of the blades includes a first optical member disposed at least partially therein, the first optical member providing a first optical pathway.

18. The plug of claim 17, wherein both of the blades include optical members therein providing first and second optical pathways.

19. The plug of claim 17, further including a ground pin.

20. The plug of claim 17, wherein the blades are positioned to be receivable in a wall outlet of a type selected from types A-M.

21. The plug of claim 20, wherein the live and common blades are oriented conform to a standard for a North American 15 A/125V ungrounded plug (Type A) and a North American 15 A/125V grounded plug (Type B).

22. The receptacle of claim 1, wherein the first void is configured to transmit voltage of at least 100V.

* * * * *